(12) United States Patent
Liu et al.

(10) Patent No.: US 10,596,671 B2
(45) Date of Patent: Mar. 24, 2020

(54) MILLING FIXTURE FOR FORGED WHEEL

(71) Applicant: CITIC DICASTAL CO., LTD, Qinhuangdao, Hebei (CN)

(72) Inventors: Weidong Liu, Hebei (CN); Dan Yao, Hebei (CN); Xiaopeng Chen, Hebei (CN); Xing Wang, Hebei (CN); Haiping Chang, Hebei (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 127 days.

(21) Appl. No.: 16/052,871

(22) Filed: Aug. 2, 2018

(65) Prior Publication Data

US 2019/0224800 A1      Jul. 25, 2019

(30) Foreign Application Priority Data

Jan. 23, 2018   (CN) .......................... 2018 1 00617457

(51) Int. Cl.
*B23Q 3/00* (2006.01)
*B23Q 16/04* (2006.01)
*B23C 3/02* (2006.01)
*B23Q 3/06* (2006.01)

(52) U.S. Cl.
CPC ................. *B23Q 16/04* (2013.01); *B23C 3/02* (2013.01); *B23Q 3/06* (2013.01); *B23C 2215/085* (2013.01)

(58) Field of Classification Search
CPC ........... B25B 1/02; B25B 1/04; B25B 1/2457; B25B 5/06; B25B 11/00; B25B 11/02; B23Q 1/03; B23Q 1/25; B23Q 3/00; B23Q 3/06
See application file for complete search history.

(56) References Cited

U.S. PATENT DOCUMENTS

| 3,556,192 | A | * | 1/1971 | Strang | B60C 25/132 |
| | | | | | 157/1.28 |
| 4,114,550 | A | * | 9/1978 | Ohkawa | B21D 51/10 |
| | | | | | 72/420 |
| 2016/0089940 | A1 | * | 3/2016 | Zhang | B60C 25/13 |
| | | | | | 157/1.28 |
| 2019/0224800 | A1 | * | 7/2019 | Liu | B23C 3/02 |

* cited by examiner

*Primary Examiner* — Lee D Wilson
(74) *Attorney, Agent, or Firm* — IPro, PLLC; Qian Gu

(57) ABSTRACT

A milling fixture for forged wheel includes a connecting plate installed on a milling machine table, a linear bearing installed on the connecting plate, a small diameter end of a positioning rod penetrates through a spring and a linear bearing, and a limiting screw installed on a side wall of the linear bearing and connected with the positioning rod. Under the coaction of the spring and an external force, the positioning rod is configured to move in the linear bearing. Bidirectional threaded rods are uniformly installed on a bottom plate, one end of each of the bidirectional threaded rods penetrate through pressure claws, the pressure claws are sandwiched between compression nuts and the connecting plate. The fixture can meet the requirement for milling a forged wheel, and at the same time, has the characteristics of a simple structure, is convenient to manufacture, provides stable performance and is low cost.

2 Claims, 3 Drawing Sheets

MILLING FIXTURE FOR FORGED WHEEL

CROSS REFERENCE TO RELATED APPLICATION

This application claims priority to Chinese Patent Application No. 201810061745.7, entitled MILLING FIXTURE FOR FORGED WHEEL and filed on Jan. 23, 2018, which is incorporated herein by reference in its entirety and for all purposes.

FIELD OF THE INVENTION

The present invention relates to a wheel machining fixture, specifically to a milling fixture for a forged wheel.

BACKGROUND OF THE INVENTION

Aluminum alloy hubs are forged and casted, in which the strength of the aluminum hubs is three times that of common aluminum hubs, and the former is 20% lighter than the latter. The maximum bearing capacity of the forged aluminum alloy hubs is five times that of steel. The aluminum alloy hubs have the characteristics of light weight, tire wear resistance and attractiveness. At the same time, the safety of the forged aluminum alloy hubs is much higher than that of steel rims. Some hubs with attractive appearance and relatively complex structure are often impossible to forge once and must be milled.

SUMMARY OF THE INVENTION

The aim of the present invention is to provide a milling fixture for forged wheel.

In order to fulfill the above aim, the technical solution of the present invention is: a milling fixture for forged wheel according to the present invention, comprising a bottom plate, a connecting plate, a positioning base, pressure claws, an end face ring, pressure claw pads, bidirectional threaded rods, compression nuts, a linear bearing, a positioning rod, a spring, a base, an expansion sleeve, a pressure plate, tightening bolts and a limiting screw.

The connecting plate is installed on a milling machine table through the bottom plate, the linear bearing is installed on the connecting plate through the positioning seat, the small diameter end of the positioning rod penetrates through the spring and the linear bearing, and the limiting screw is installed on the side wall of the linear bearing and is connected with the positioning rod to limit the position of the positioning rod in the linear bearing. Under the coaction of the spring and an external force, the positioning rod can move in the linear bearing and is inserted into a wheel valve hole.

The bidirectional threaded rods are uniformly installed on the bottom plate, one ends of the bidirectional threaded rods penetrate through the pressure claws, the compression nuts are installed at another ends of the bidirectional threaded rods, the pressure claws are sandwiched between the compression nuts and the connecting plate, the pressure claw pads are installed on the pressure claws and fasten the compression nuts, and the pressure claws compress a wheel lip through the pressure claw pads.

The base is installed on the bottom plate, the upper end surface and the inner wall tapered surface of the expansion sleeve are respectively connected with the pressure plate and the outer tapered surface of the base through the tightening bolts, eight gaps are uniformly distributed on the side wall of the expansion sleeve, the pressure plate compresses the expansion sleeve to move down during the process of screwing down the tightening bolts, and the diameter of the expansion sleeve gradually increases through the fit of the inner wall tapered surface of the expansion sleeve and the outer tapered surface of the base, and finally the expansion sleeve expands the center hole of the wheel.

The front end of the positioning rod is a positioning tapered surface; the middle side wall of the positioning rod has a vertical slot, the front end of the vertical slot is a ¼ ring slot, and the front end surface of the limiting screw can be in contact with the vertical slot to limit the extreme position of the positioning rod in the linear bearing. When the limiting screw moves to the ¼ ring slot, the positioning rod can overcome the elastic force of the spring and is fixed at this position, and in this state, the wheel can be loaded and unloaded.

In order to ensure the circumferential positioning precision, the lower end surface of the base is in small clearance fit with the connecting plate.

Before actual use, the limiting screw is at the ring slot of the positioning rod, and the spring is in a compressed state. In practical use, a wheel is placed on the fixture, the expansion sleeve stretches into the center hole of the wheel, the wheel is rotated to align the valve hole with the positioning rod, the positioning rod is rotated, the limiting screw is in the vertical slot, and the front positioning tapered surface of the positioning rod stretches into the valve hole of the wheel under the action of the spring. The tightening bolts are screwed down, the pressure plate compresses the expansion sleeve to move down, and the diameter of the expansion sleeve gradually increases through the fit of the inner wall tapered surface of the expansion sleeve and the outer tapered surface of the base, and finally the expansion sleeve expands the center hole of the wheel. Then, six compression nuts distributed uniformly are screwed down in succession, and the pressure claws compress the wheel lip through the pressure claw pads. So far, clamping and positioning of the wheel are completed. The wheel can be machined by programming a milling machine in advance.

The fixture according to the invention can meet the requirement for milling a forged wheel, and at the same time, has the characteristics of simple structure, convenient manufacture, stable performance and low cost.

Figure 1:
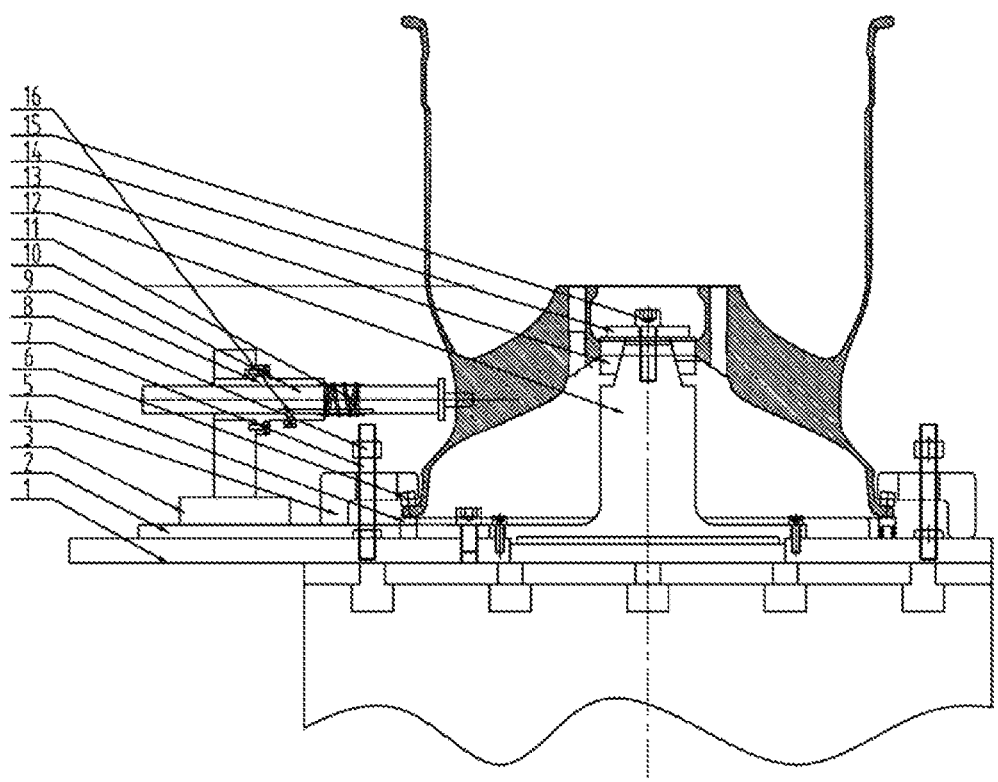
FIG. 1 is a cross-sectional side elevation view of a milling fixture for forged wheel of the present invention.
Figure 2:
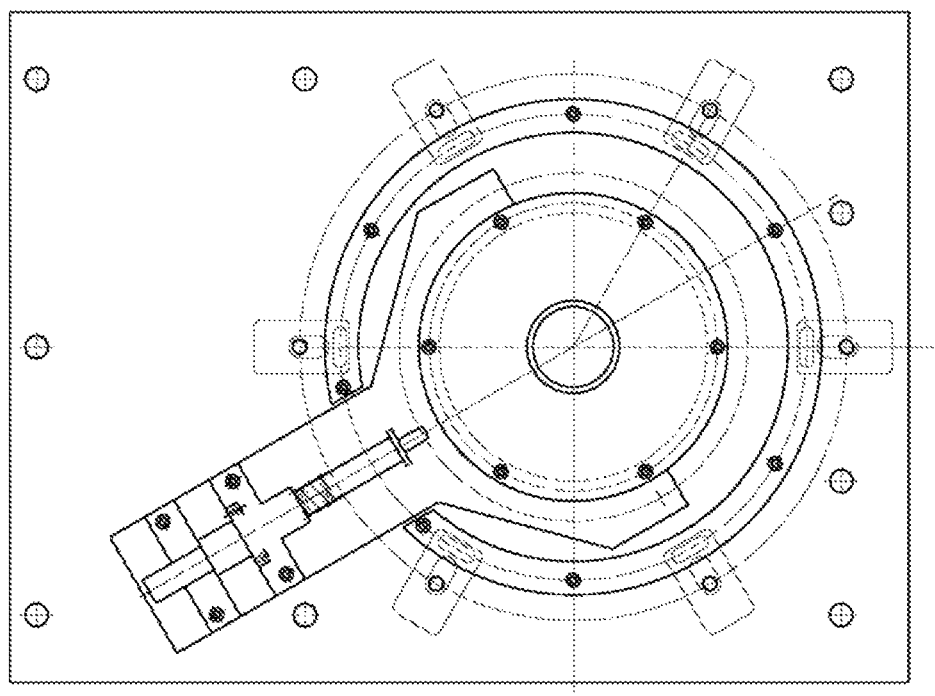
FIG. 2 is a top plan view of the milling fixture for forged wheel of the present invention.
Figure 3:
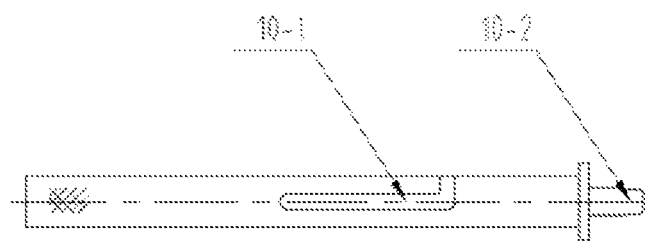
FIG. 3 is a side elevation view of a positioning rod in the milling fixture for forged wheel of the present invention.

In which, 1—bottom plate, 2—connecting plate, 3—positioning base 3, 4—pressure claw, 5—end face ring, 6—pressure claw pad, 7—bidirectional threaded rod, 8—compression nut, 9—linear bearing, 10—positioning rod, 11—spring, 12—base, 13—expansion sleeve, 14—pressure plate, 15—tightening bolt, 16—limiting screw.

DETAILED DESCRIPTION OF THE EMBODIMENTS

The details and working conditions of the specific device according to the present invention will be described in detail below in combination with the drawings.

A milling fixture for forged wheel according to the present invention comprises a bottom plate 1, a connecting plate 2, a positioning base 3, pressure claws 4, an end face ring 5, pressure claw pads 6, bidirectional threaded rods 7, compression nuts 8, a linear bearing 9, a positioning rod 10, a spring 11, a base 12, an expansion sleeve 13, a pressure plate 14, tightening bolts 15 and a limiting screw 16.

The connecting plate 2 is installed on a milling machine table through the bottom plate 1, the linear bearing 9 is installed on the connecting plate 2 through the positioning seat 3, the small diameter end of the positioning rod 10 penetrates through the spring 11 and the linear bearing 9, and the limiting screw 16 is installed on the side wall of the linear bearing 9 and is connected with the positioning rod 10 to limit the position of the positioning rod 10 in the linear bearing 9. Under the coaction of the spring 11 and an external force, the positioning rod 10 can move in the linear bearing 9 and is inserted into a wheel valve hole.

The bidirectional threaded rods 7 are uniformly installed on the bottom plate 1, one ends of the bidirectional threaded rods 7 penetrate through the pressure claws 4, the compression nuts 8 are installed at another ends of the bidirectional threaded rods 7, the pressure claws 4 are sandwiched between the compression nuts 8 and the connecting plate 2, the pressure claw pads 6 are installed on the pressure claws 4 and fasten the compression nuts 8, and the pressure claws 4 compress a wheel lip through the pressure claw pads 6.

The base 12 is installed on the bottom plate 1, the upper end surface and the inner wall tapered surface of the expansion sleeve 13 are respectively connected with the pressure plate 14 and the outer tapered surface of the base 12 through the tightening bolts 15, eight gaps are uniformly distributed on the side wall of the expansion sleeve 13, the pressure plate 14 compresses the expansion sleeve 13 to move down during the process of screwing down the tightening bolts 15, and the diameter of the expansion sleeve 13 gradually increases through the fit of the inner wall tapered surface of the expansion sleeve 13 and the outer tapered surface of the base 12, and finally the expansion sleeve expands the center hole of the wheel.

The front end of the positioning rod 10 is a positioning tapered surface 10-2; the middle side wall of the positioning rod 10 has a vertical slot 10-1, the front end of the vertical slot 10-1 is a ¼ ring slot, and the front end surface of the limiting screw 16 can be in contact with the vertical slot 10-1 to limit the extreme position of the positioning rod 10 in the linear bearing 9. When the limiting screw 16 moves to the ¼ ring slot, the positioning rod 10 can overcome the elastic force of the spring 11 and is fixed at this position, and in this state, the wheel can be loaded and unloaded.

In order to ensure the circumferential positioning precision, the lower end surface of the base 12 is in small clearance fit with the connecting plate 2.

Before actual use, the limiting screw 16 is at the ring slot 10-1 of the positioning rod 10, and the spring 11 is in a compressed state. In practical use, a wheel is placed on the fixture, the expansion sleeve 13 stretches into the center hole of the wheel, the wheel is rotated to align the valve hole with the positioning rod 10, the positioning rod 10 is rotated, the limiting screw 16 is in the vertical slot 10-1, and the front positioning tapered surface 10-2 of the positioning rod 10 stretches into the valve hole of the wheel under the action of the spring 11. The tightening bolts 15 are screwed down, the pressure plate 14 compresses the expansion sleeve 13 to move down, and the diameter of the expansion sleeve 13 gradually increases through the fit of the inner wall tapered surface of the expansion sleeve 13 and the outer tapered surface of the base 12, and finally the expansion sleeve expands the center hole of the wheel. Then, six compression nuts 8 distributed uniformly are screwed down in succession, and the pressure claws 4 compress the wheel lip through the pressure claw pads 6. So far, clamping and positioning of the wheel are completed. The wheel can be machined by programming a milling machine in advance.

The invention claimed is:

1. A milling fixture for a forged wheel, comprising a bottom plate, a connecting plate, a positioning base, a plurality of pressure claws, an end face ring, a plurality of pressure claw pads, a plurality of bidirectional threaded rods, a plurality of compression nuts, a linear bearing, a positioning rod, a spring, a base, an expansion sleeve, a pressure plate, a plurality of tightening bolts and a limiting screw, wherein the connecting plate is installed on a milling machine table through the bottom plate, the linear bearing is installed on the connecting plate through the positioning base, a small diameter end of the positioning rod penetrates through the spring and the linear bearing, and the limiting screw is installed on a side wall of the linear bearing and is connected with the positioning rod to limit a position of the positioning rod in the linear bearing; under the coaction of the spring and an external force, the positioning rod is configured to move in the linear bearing and is inserted into a wheel valve hole; the plurality of bidirectional threaded rods are uniformly installed on the bottom plate, one end of each of the plurality of bidirectional threaded rods penetrate through the plurality of pressure claws, the plurality of compression nuts are installed at another end of each of the plurality of bidirectional threaded rods, the plurality of pressure claws are sandwiched between the plurality of compression nuts and the connecting plate, the plurality of pressure claw pads are installed on the plurality of pressure claws and fasten the plurality of compression nuts, and the plurality of pressure claws compress a wheel lip through the plurality of pressure claw pads; the base is installed on the bottom plate, an upper end surface and an inner wall tapered surface of the expansion sleeve are respectively connected with the pressure plate and an outer tapered surface of the base through the plurality of tightening bolts, eight gaps are uniformly distributed on a side wall of the expansion sleeve, the pressure plate compresses the expansion sleeve to move down during the process of screwing down the plurality of tightening bolts, and a diameter of the expansion sleeve gradually increases through a fit of the inner wall tapered surface of the expansion sleeve and the outer tapered surface of the base, and the expansion sleeve expands a center hole of a wheel.

2. The milling fixture for the forged wheel according to claim 1, wherein a front end of the positioning rod includes a positioning tapered surface; a middle side wall of the positioning rod has a vertical slot, a front end of the vertical slot includes a ¼ ring slot, and a front end surface of the limiting screw is configured to be in contact with the vertical slot to limit an extreme position of the positioning rod in the linear bearing; and when the limiting screw moves to the ¼ ring slot, the positioning rod is configured to overcome an elastic force of the spring.

* * * * *